Nov. 1, 1960  W. A. BARDEN ET AL  2,958,748
COMBINATION ELECTRICAL CONTROL
Filed April 27, 1959  4 Sheets-Sheet 3
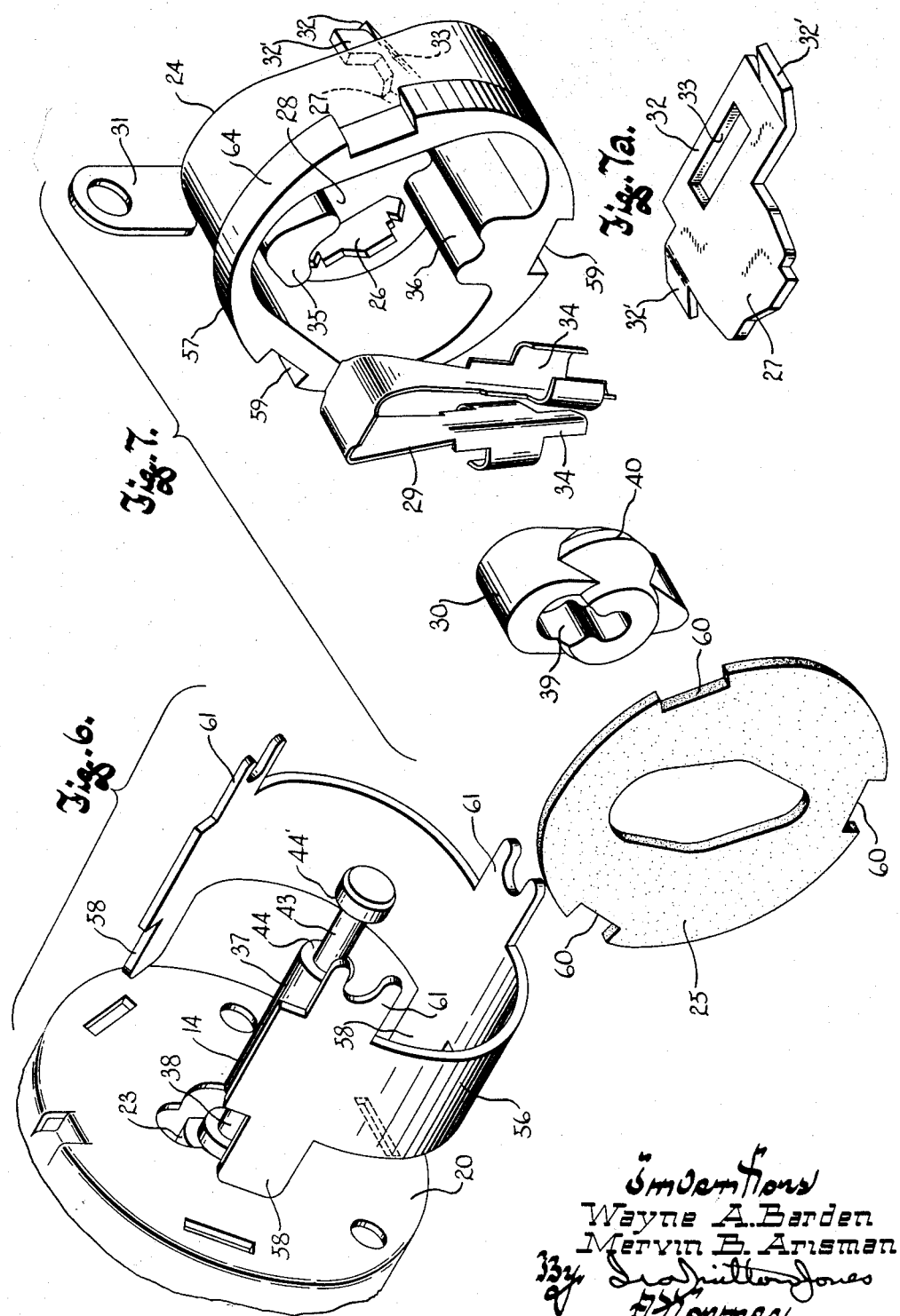
Inventors
Wayne A. Barden
Mervin B. Arisman
By
Attorneys

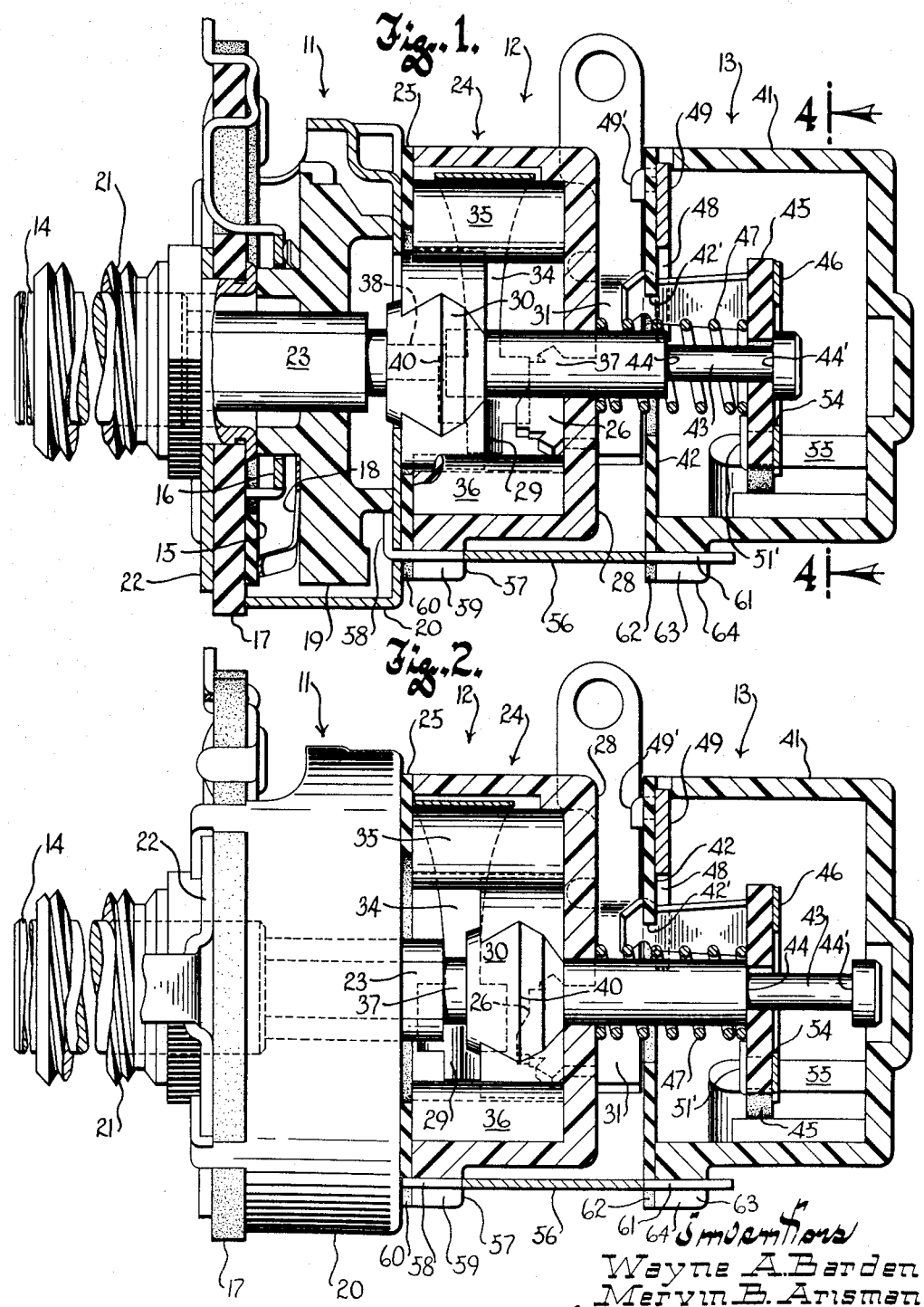

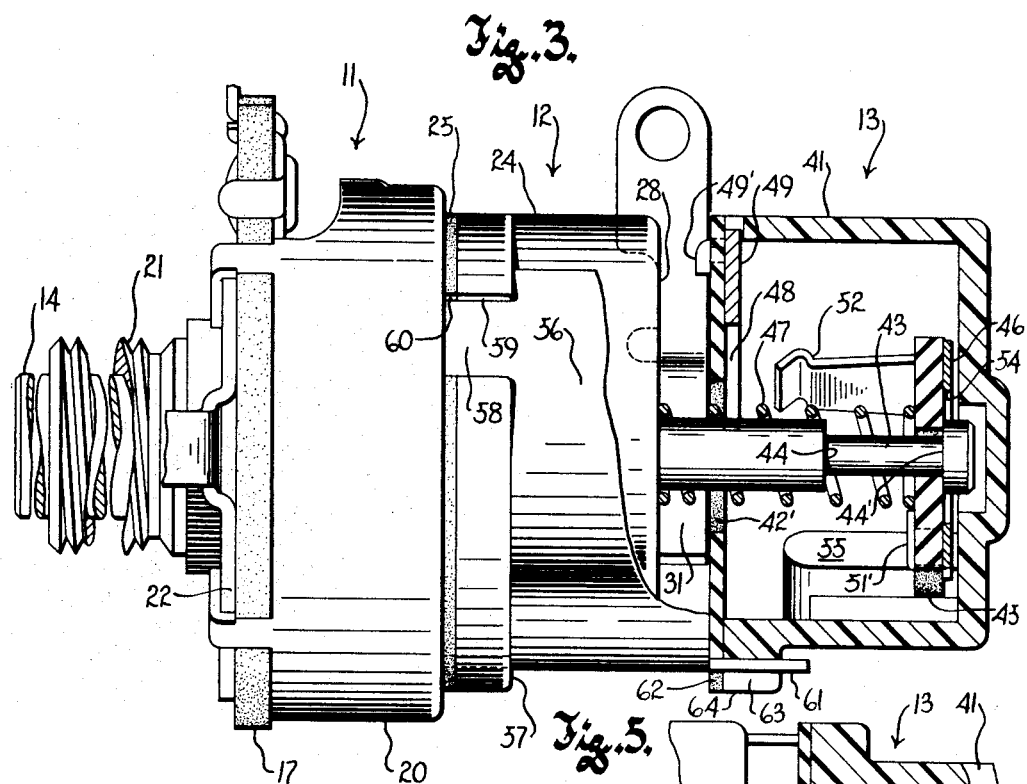
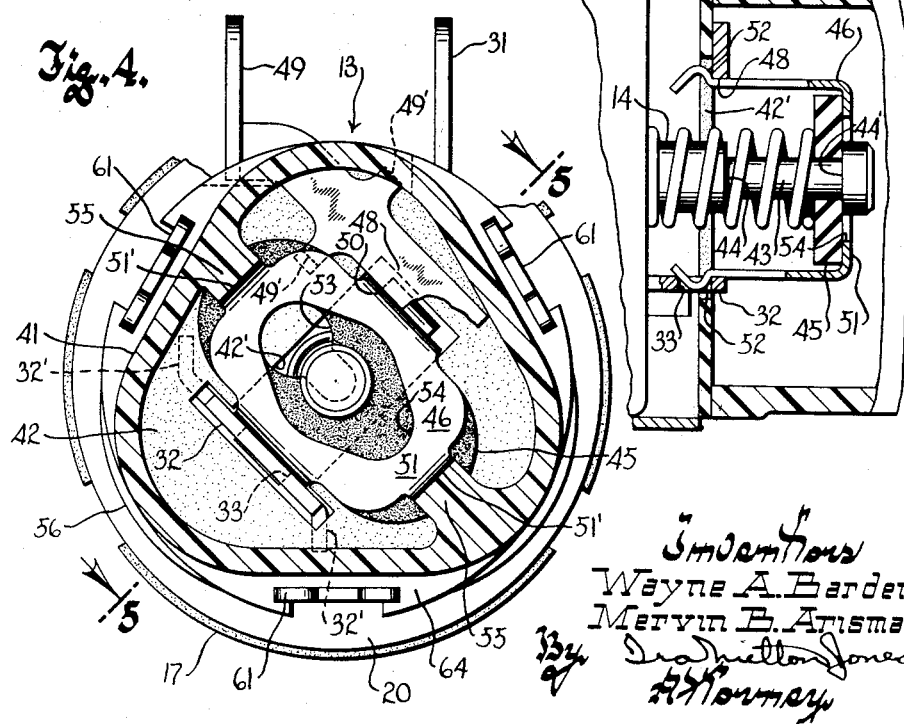

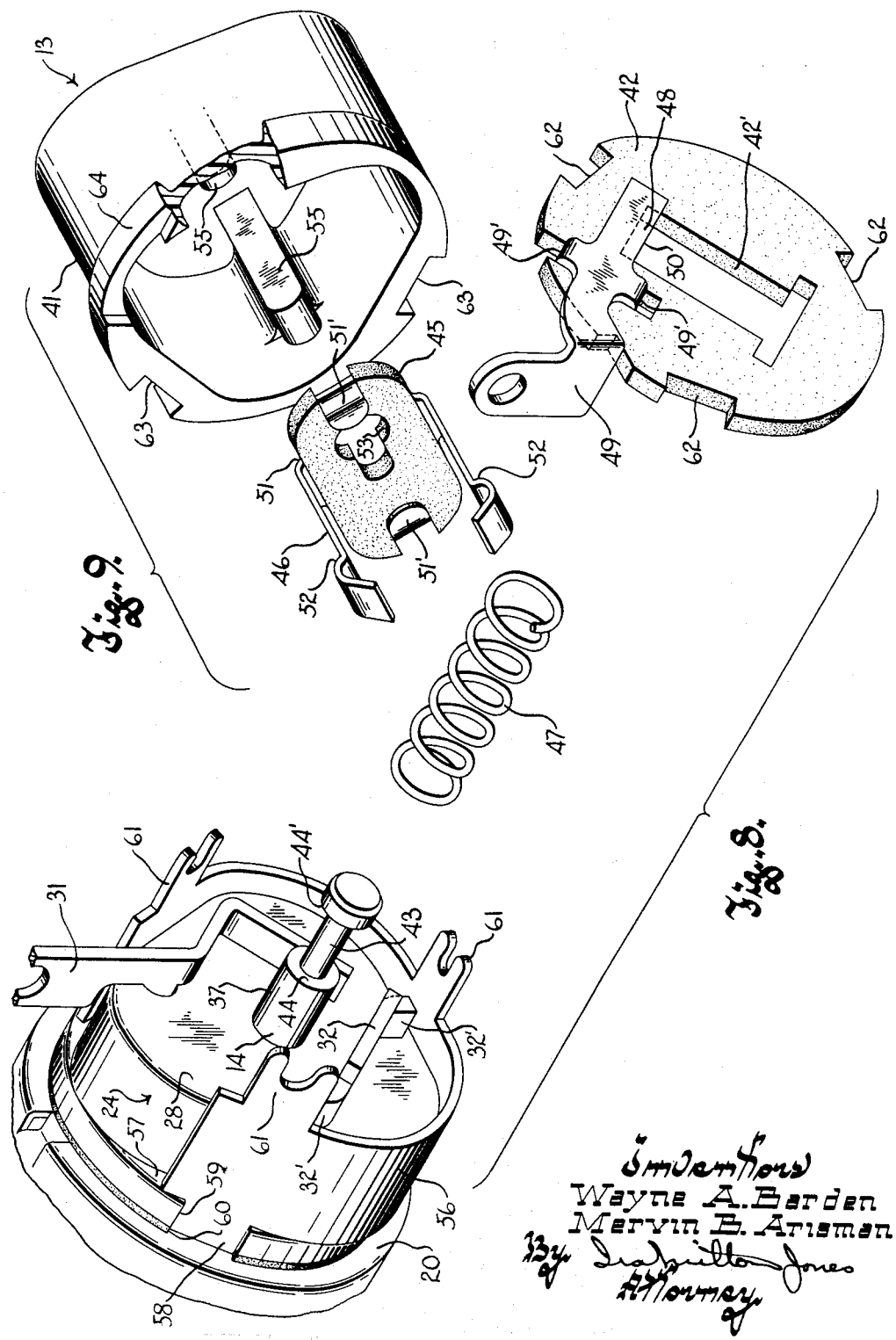

United States Patent Office 2,958,748
Patented Nov. 1, 1960

2,958,748

COMBINATION ELECTRICAL CONTROL

Wayne A. Barden and Mervin B. Arisman, Elkhart, Ind., assignors to CTS Corporation, Elkhart, Ind., a corporation of Indiana Filed Apr. 27, 1959, Ser. No. 809,114

13 Claims. (Cl. 200—114)

This invention relates to a combination electrical control of the type used in radio and television receivers and has more particular reference to a control structurally and operatively incorporating a variable resistor, an on-off switch and an overload circuit breaker.

Some radio and television receivers heretofore available have had self-contained overload protection, but most of them did not. Where they were so protected, the circuit protecting device has usually consisted of a replaceable and expendable fuse or a resettable circuit breaker. In either event, a separately mounted single purpose component was required; and because of its relatively infrequent use or operation, this component was mounted inside the receiver housing and often relegated to an almost inaccessible location therein.

A sudden extreme line surge, of course, creates an overload condition within the receiver. This overload will trip or blow the overload protection device (if one is provided) depending upon its being of the circuit breaker or fuse variety. In either case, reactivation of the device needed to restore the receiver to operativeness because of the customarily remote location of the device in the receiver, involved undesirable effort and inconvenience.

The present invention eliminates this objection by providing a more conveniently located and a more easily reset circuit overload protection device, and to that end it is an object of this invention to combine an overload protection device in a new and novel way with other necessary receiver components, whereby a combination control is achieved which furnishes a structurally improved circuit overload protection device conveniently located within the receiver.

More particularly it is an object of this invention to provide a combination variable resistor, on-off switch, and thermally actuated circuit breaker, in which the switch and the circuit breaker are connected in series so that the opening of either one disconnects the receiver from the line.

A further object of this invention is to provide a combination control wherein all of the units comprising the control are operable by a single actuator shaft. In this connection, it is also a specific object of this invention to provide a combination control of the character described wherein resetting of the circuit breaker may be readily accomplished by a single axial motion of the actuator shaft of the device and concomitantly with closure of the on-off switch.

Another object of this invention is to provide a control in which an on-off switch and a circuit breaker are so combined and related that the tripping of the circuit breaker also opens the switch; but in which the switch may be opened without tripping the circuit breaker. As will be readily apparent, the opening of the switch by the tripping of the circuit breaker has the advantage of precluding reenergization of the receiver in the event of accidental reclosure of the circuit breaker upon cooling of its thermally responsive element.

Still another object of this invention is to provide a thermally actuated circuit breaker having a contactor movable to and from a circuit making position, and wherein the contactor itself not only generates heat as a consequence of excessive current flow therein, but also flexes in response to such heat, to thereby trip the circuit breaker.

A control attaining the foregoing objects has the twofold advantage of enabling the receiver manufacturer, to provide a better electrically protected receiver at little or no extra cost, and of providing a resettable safety control which is readily accessible to the receiver owner.

The advantage to the manufacturer stems from the fact that the combination control of this invention enables him to combine two assembly operations into a single operation. Previously the manufacturer had to separately assemble the circuit breaker and the on-off switch into the receiver. By contrast, the control of this invention not only enables both components to be physically assembled into the receiver in one operation, but also enables both components to be electrically connected into the circuitry of the receiver at the same time.

With the foregoing and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The acompanying drawings illustrate one complete example of the physical embodiment of the invention constructed according to the best mode so far devised for the practical application of the principles thereof, and in which:

Figure 1 is an enlarged longitudinal sectional view through a combination electrical control embodying this invention and comprising a variable resistor, a push-pull type on-off switch, and a circuit breaker, the switch and the circuit breaker being shown in their closed conditions;

Figure 2 is a view similar to Figure 1 but showing the circuit breaker in its closed or circuit making conditon and the switch open, the variable resistor being shown in side elevation in this view;

Figure 3 is another view similar to Figure 1, but with much of the view in side elevation and with the circuit breaker shown in its tripped or open condition;

Figure 4 is a cross-sectional view through Figure 1 on the plane of the line 4—4, said view being essentially an end view of the circuit breaker and switch;

Figure 5 is a fragmentary detail sectional view through Figure 4 on the plane of the line 5—5, to more clearly illustrate the circuit breaker;

Figure 6 is a perspective view of the rear end of the variable resistor with the common actuator shaft of the control protruding therefrom, and of the part by which the three components are tied together upon assembly;

Figure 7 is an exploded perspective view of the switch, viewing the same essentially from the front;

Figure 7a is a perspective view of one of the stationary contacts of the switch, shown detached from the switch body or housing;

Figure 8 is a perspective view of the rear of the switch shown mounted upon the back of the variable resistor, and also of the next-to-be assembled parts of the circuit breaker; and Figure 9 is a perspective view of remainder of the circuit breaker, namely, its contactor and its housing, said view being essentially from the front.

Referring now to the accompanying drawings wherein like reference characters have been applied to like parts throughout the several views, the control consists generally of a variable resistor 11, a push-pull type on-off switch 12, and a circuit breaker 13, all arranged in tandem and operable by a common actuator shaft 14. As will be more fully explained hereinafter, the circuit breaker and the switch are interconnected by the shaft 14 in such a way that upon tripping of the circuit breaker due to a circuit overload condition, the switch is also opened but without affecting the setting of the variable resistor. Also, by virtue of this interconnection between the actuator shaft and the three components, closure of the switch resets the circuit breaker if it has been tripped, while opening of the switch takes place without disturbing the circuit breaker; and of course, rotation of the shaft to adjust the variable resistor in nowise affects the switch or circuit breaker.

The variable resistor is of conventional construction and comprises a stator consisting of an arcuate resistance element 15 and a collector ring 16 concentrically fixed to the inner face of a base 17; and a rotor comprising a contactor 18 which is carried by a molded driver 19 slidably splined to the shaft 14. The contactor has spring fingers which wipingly engage the stator elements, and at its rear the driver 19 has a circular flange which bears against the rear wall of a cup-shaped metal cover 20 to hold the driver against rearward displacement and thereby assure proper contact pressure between the spring fingers of the contactor and the stator elements upon which they ride. The cup-shaped cover 20 cooperates with the base 17 to provide a housing for the variable resistor.

Fixed in and extending coaxially forwardly from the base 17 is a flanged mounting bushing 21 in which the control shaft 14 is slidably and rotatably received. The bushing holds a ground plate 22 flatwise over the front face of the base, and the front end portion of the bushing is externally threaded for conventional panel mounting of the entire control. As is customary, the shaft projects forwardly beyond the bushing to provide for manual actuation of the control and extends rearwardly through the rear wall of the metal cover 20 for connection with the switch and the circuit breaker.

As stated, the shaft is slidably splined to the driver 19 to constrain the rotor to rotate with the shaft. To so connect the shaft with the driver, the shaft has a portion 23 of non-circular cross section fitting in a correspondingly shaped hole in the molded driver, and the length of the non-circular shaft portion 23 is sufficient to permit the shaft to be moved axially a substantial distance, relative to the variable resistor, without disturbing the setting of the resistor.

The switch instrumentalities are housed in a cup-shaped body 24, molded of suitable insulating material, and partially closed at its open front end by an insulator disc 25 which flatwise overlies the rear wall of the variable resistor housing. The switch and the variable resistor are essentially like the combination of these two units forming the subject matter of Patent No. 2,881,280, to which reference may be had for details not specifically defined herein.

The switch has a pair of stationary contacts 26 and 27 fixed to the rear wall 28 of its housing and projecting forwardly from the inner face thereof, a bridging contactor 29 movable back and forth into and out of engagement with the stationary contacts, and a switch actuator 30. The actuator 30 moves axially back and forth with the shaft 14 and coacts with the contactor to move the latter with a snap action to and from its bridging position. The stationary contacts are disposed at opposite sides of the shaft axis, and their front edges provide the contactor engaging portions thereof. The contact 26 has a terminal portion 31 overlying the outer face of the rear wall and projecting laterally beyond the side of the housing. The other contact 27 has a second contactor engaging portion 32 projecting straight back from the outer face of the housing rear wall, and for a purpose to be later described, this portion 32 has a slot or hole 33 therein.

The movable bridging contactor 29 is a U-shaped spring having relatively long arms 34 connected by a curved bight portion. Guide lugs 35 and 36 integral with the side wall of the housing and projecting forwardly from its rear wall 28 are straddled by the movable contactor 29, and thus guidingly constrain the contactor to fore and aft movement toward and from the rear wall. In the rearmost position of the contactor, its arms engage the front edges of the stationary contacts to electrically bridge the same, but in its foremost position all parts of the movable contactor are spaced a substantial distance from the stationary contacts and the switch is "open."

The portion 37 of the actuator shaft which extends through the switch housing is of smaller diameter than the splined portion 23 immediately in front of it and has a circumferential groove 38 defining a reduced diameter neck and opposing shoulders. It is on this portion of the shaft that the switch actuator 30 is mounted; and to enable such placement, the actuator has a keyhole shaped opening 39 therein. The large part of this opening accommodates the full diameter of the shaft portion 37, and the small part thereof snugly receives the neck formed by the groove 38; and since the actuator fits closely between the shoulders formed by the sides of the groove, it is constrained to move back and forth with the shaft when in place thereon. During such motion, the actuator is guided by the guide lugs 35 and 36 between which it slides.

The arms 34 of the movable contactor are biased toward one another, and embrace the actuator under spring tension, and the opposite sides of the actuator, with which the spring arms engage, have oppositely inclined surfaces diverging fore and aft and defining a crest 40. The range of fore and aft movement of the shaft, and hence the actuator is such that the contactor arms will always bear against the inclined sides of the actuator either ahead of or behind the crest 40, depending upon which of its two normal positions the actuator is in. Hence, as the shaft is axially moved forwardly or rearwardly, the crest 40 first spreads apart the contactor arms 34 and then, as it passes between them, the coaction of the tapered sides of the actuator and the biasing force stored in the arms snaps the contactor in the direction opposite to that in which the actuator was moved.

The circuit breaker housing is similar to the switch housing in that it comprises a cup-shaped body 41 molded of a suitable insulating material, and partially closed at its front end by a disc-shaped base 42 stamped from insulating material. The actuator shaft enters the circuit breaker housing through a substantially T-shaped opening 42′ in the central portion of the base 42, and inside the housing the shaft is reduced in diameter to provide an elongated neck portion 43 between opposing shoulders 44—44′. Seated on this neck portion for movement axially of the shaft to the extent limited by the shoulders, is a driver disc or contactor carrier 45, and fixed to this disc or carrier is a substantially U-shaped movable contactor 46 with its legs extending forwardly. A coil spring 47 encircling the shaft and confined between the rear wall 28 of the switch housing and the contactor carrier 45, biases the latter and, of course, the contactor, to its rearmost position with respect to the shaft, defined by the shoulder 44′. In this position of the contactor, the circuit breaker may be either open or closed, depending upon the axial position of the shaft. For closure of the circuit breaker, the free ends of the legs of its U-shaped contactor engage the second contactor engaging portion 32 of the stationary switch contact 27, and the contactor engaging portion 48 of a combined stationary contact and terminal 49 mounted on the base 42.

The combined stationary contact and terminal 49, as best seen in Figure 9, has its contactor engaging portion 48 flatwise overlying the inner face of the base 42 to which it is secured by tanks 49', with an edge portion 50 thereof overhanging the bottom end of the T-shaped opening 42'. The terminal portion of the member 49 is disposed edgewise to the base 42 and projects laterally beyond one side of the switch and circuit breaker housings like the terminal 31 to which it is substantially parallel.

The contactor 46 is stamped from resiliently flexible bimetal, and being U-shaped it has a bight portion 51 which is preferably flat and flatwise overlies the rear face of the carrier 45, to which it is secured by tangs 51'. The legs of the U-shaped contactor, which project forwardly, have extremities bent to define outwardly directed detents or latching shoulders 52, one of which engages in the slot or hole 33 in the second contactor engaging portion 32 of the stationary contact 27, and the other of which engages over the edge 50 of the contact 49 when the contactor 46 is in its circuit making position. The edge 50 and the rear edge of the slot or hole 33 thus constitute latch keeper means or abutments with which the latching shoulders 52 engage with a detent-like action to hold the circuit breaker in a circuit making condition.

The bimetallic legs of the contactor 46 are normally divergent, or biased apart, so that their latching shoulders 52 will be held engaged with the stationary latch keeper means or abutments under spring tension, provided, of course, that the contactor has been moved to its closed position; but when heated the legs flex inwardly or toward one another and thereby disengage their latching shoulders from the latch keeper means. When this happens, the spring 47 snaps the contactor rearward to its circuit breaking position.

The contactor carrier 45 is stamped from a sheet of suitable insulating material, and has a central key-hole shaped aperture 53 which aligns with an elliptical opening 54 in the bight of the U-shaped contactor. The key-hole shape of the aperture 53 enables assembly of the contactor assembly (which comprises the carrier 45 and the contactor 46) with the reduced rear end portion 43 of the actuator shaft, and parallel diametrically opposite guide ribs 55 integral with the side wall of the housing and slidably engaged in notches in the edge of the carrier 45 hold the contactor assembly on the shaft and constrain it to translatory movement to and from its closed circuit making position.

It should be noted that the connection between the actuator shaft and the contactor carrier 45 allows a degree of relative or lost motion between the shaft and the contactor. The extent of this lost motion is determined by the length of the reduced diameter portion 43 of the shaft, and is sufficient to permit the switch to be manually opened and closed without disturbing the contactor of the circuit breaker if the latter is in its closed position. However, the parts are so related and proportioned that if the circuit breaker is in its tripped or open condition, its contactor will be moved forward to reset the circuit breaker concomitantly with closure of the switch. Also, in the event the circuit breaker trips open, which can only happen when the switch is closed, the spring produced rearward movement of the circuit breaker contactor will carry the actuator shaft with it, thus snapping the switch open.

Attention is directed to the fact that the switch contacts 26 and 27 are secured to the wall 28 in the customary manner, i.e. by staking portions thereof over the front edges of the holes in the wall through which they pass. To add stability to the anchorage of these contacts, the terminal portion 31 of the stationary switch contact 26 has its portion which overlies the rear wall of the switch housing, bent into substantially a right angle, and the second contactor engaging portion 32 of the other stationary contact 27 is flanked by oppositely directed wings 32'. The rear edges of the wings 32' and the entire rear edge of the terminal portion 31 lie in a common plane normal to the shaft axis, and preferably are spaced slightly from the base 42 of the circuit breaker.

The second contactor engaging portion 32 projects into the circuit breaker housing through the head portion of the T-shaped hole 42' in the base 42. The extent of this entry of the contactor engaging portion 32 into the circuit breaker housing, as best seen in Figure 5, is such that the rearmost edge of its slot or hole 33, like the front extremity of the edge 50 on the opposite contactor engaging portion 48, are coplanar with the inner face of the base 42. Hence, the two latch keeper means which these edges form, are simultaneously engageable by the detents or latching shoulders 52 on the contactor.

The variable resistor, the on-off switch and the circuit breaker are secured together in the tandem relationship described by a metal band 56. This band embraces the switch housing and has its front edge abutting the rear of a flange 57 on the housing and its rear edge abutting the front face of the circuit breaker base 42. Forwardly extending tangs 58 on the band project through aligned notches 59 and 60 in the flange 57, and the disc 25, respectively, and through slit-like apertures in the rear wall of the variable resistor cover 20, and have their front end portions bent over the inside surface of this wall, to thus secure the band to the resistor housing.

Projecting rearwardly from the rear edge of the band 56 are bifurcated tangs 61. These tangs extend through aligned notches 62 and 63, respectively, in the base 42 and a flange 64 on the front of the circuit breaker housing, and have their bifurcations spread apart behind the flange 64. Hence, the band 56 ties the circuit breaker housing to the variable resistor cover, with the switch housing clamped therebetween. In addition, the reception of the forwardly projecting tangs 58 and the rearwardly projecting tangs 61 in their respective notches, secures the three components in proper orientation rotationwise, with the terminals projecting through the space between the circumferentially spaced ends of the band.

*Operation*

When the combination control of this invention is wired into a receiver circuit, the switch and the circuit breaker are connected in series, so that when both are closed, the circuit controlled thereby is bridged between the terminals 31 and 49; and, of course, the variable resistor is connected into the circuit in the usual manner.

Initial forward actuation of the shaft 14 snaps the movable switch contactor 29 rearwardly into bridging engagement with the stationary contacts 26 and 27, thus closing the switch. This pull on the shaft also sets or closes the circuit breaker since the shoulder 44' on the shaft, by its engagement with the contactor carrier 45, moves the contactor 46 forwardly causing the latching shoulders 52 on the bimetallic legs of the contactor to snap into detent engagement with the latch keeper means 33 and 50. Such engagement, of course, bridges the stationary contacts of the circuit breaker and loads the spring 47. This is the condition of the control illustrated in Figure 1, and as will be readily apparent, its attainment required no change in the setting of the variable resistor since rotation of the shaft was not needed.

Normally, the variable resistor and switch will be operable independently of, and without interfering with the circuit breaker setting. In other words, once the circuit breaker has been set in its circuit making position, the switch may be manually opened and closed without tripping the circuit breaker. Normal manual opening of the switch is accomplished by simply pushing the shaft in. This snaps the switch open but does not open the circuit breaker because of the lost motion connection between the shaft and the circuit breaker contactor assembly provided by the elongated neck portion 43 of the shaft. Upon such opening of the switch the control is in its condition shown in Figure 2.

If the receiver or other electrical apparatus in which the device is installed is subjected to a circuit overload condition, then the current passing through the circuit breaker contactor will cause the contactor to become heated due to its inherent resistance, and if the overload condition is of sufficient duration or current intensity, the internal heat will cause the bimetallic legs of the contactor to flex or curl inwardly towards one another until they disengage their latching shoulders 52 from the latch keeper means or abutments 33 and 50. At that instant, the compression spring 47 snaps contactor assembly 45—46 rearwardly to its circuit breaking position, and pulls the switch actuator 30 rearward to effect opening of the switch. This concomitant opening of the switch has the advantage of precluding unintentional re-energization of the controlled circuit which would otherwise occur if the circuit breaker contactor 46, upon cooling, engaged its stationary contacts.

From the foregoing description, taken together with the accompanying drawings, it will be apparent to those skilled in the art that this invention provides a control device comprising a variable resistor, an on-off switch, and a novel circuit breaker, all combined into a compact assembly and actuatable by a single shaft which provides for adjustment of the variable resistor, actuation of the switch to its on and off positions, and resetting of the circuit breaker.

What is claimed as our invention is:

1. A combined switch and circuit breaker for manually opening and closing a circuit and for automatically opening the circuit when the current flow therein exceeds a predetermined value, comprising: a base of insulating material; a switch at one side of the base and consisting of a pair of stationary contacts on the base and a bridging contactor engageable with said stationary contacts; means on the base mounting said bridging contactor for movement to and from its bridging position; a circuit breaker at the other side of the base comprising a second pair of stationary contacts, and a second bridging contactor cooperable therewith, said second bridging contactor having a flexible bimetallic leg with a free end portion movable laterally in one direction in consequence of a temperature rise due to passage through said second bridging contactor of a current exceeding a predetermined value; means on the free end portion of said bimetallic leg defining a latching shoulder extending laterally in the direction opposite to that in which said portion of the leg is movable due to a rising temperature thereat; latch keeper abutment means fixed with respect to the base and engageable by the latching shoulder; means mounting said second bridging contactor for bodily back and forth movement in directions substantially parallel to the length of said bimetallic leg, to and from a circuit closing position in which it bridges said second pair of stationary contacts and said latching shoulder is engaged with said latch keeper abutment means to hold the second bridging contactor against movement out of said position; spring means yieldingly biasing the second bridging contactor in the direction away from its circuit closing position so that upon disengagement of said latching shoulder from said latch keeper abutment means in consequence of thermally produced lateral movement of said bimetallic leg, the second bridging contactor will be urged to an open circuit position in which its contact engaging portions are disengaged from said second pair of stationary contacts; an actuator shaft extending through the base and movable axially in opposite directions; means providing a motion transmitting connection between the actuator shaft and said first bridging contactor whereby motion of the actuator shaft in opposite directions effects movement of the first bridging contactor to and from its bridging position; and means providing a lost motion connection between said actuator shaft and the second bridging contactor operable upon movement of the actuator shaft in the direction to effect movement of the first bridging contactor to its bridging position to also bodily move the second bridging contactor from its circuit breaking position to its circuit making position, against the bias of said spring means, but movement of the actuator shaft in the opposite direction does not change the position of said second bridging contactor.

2. The structure set forth in claim 1 wherein the contactor of the circuit breaker is substantially U-shaped and has its legs projecting toward the base, with its contact engaging portions at the free ends of its legs; wherein said flexible bimetallic leg comprises one of the legs of the U-shaped contactor; wherein said actuator shaft has a portion thereof extending between the legs of said U-shaped contactor and passing freely through a hole in the bight portion thereof; and wherein said lost motion connection comprises axially spaced shoulders on said shaft portion and between which the bight portion of the contactor is located.

3. The combined switch and circuit breaker of claim 1, further characterized by the fact that one of the stationary contacts of the switch and one of the stationary contacts of the circuit breaker comprise portions of a single conductive member which extends through the base so that the switch and circuit breaker are connected in series.

4. A resettable circuit breaker comprising: a base of insulating material; a pair of fixed contacts mounted on the base and exposed at one face thereof; a contactor engageable with said contacts to electrically bridge the same; means on the base mounting the bridging contactor for movement to and from a circuit making position of engagement with both stationary contacts; spring means yieldingly biasing the bridging contactor away from its circuit making position; latch keeper means on the base; latch means on the bridging contactor cooperable with said latch keeper means to releasably retain the contactor in its circuit making position against the bias of said spring means, said latch means including a flexible bimetallic arm having a free end portion adapted to flex laterally in one direction in consequence of heating of the arm; a latching shoulder on the free end of said arm adapted to engage said keeper means and thereby hold the contactor in its circuit making position until heat produced lateral flexure of the arm disengages the shoulder from the keeper means; a shaft extending through the base and freely movable axially in both directions relative to the base; and a lost motion connection between the shaft and the bridging contactor unidirectionally effective to move the bridging contactor toward its circuit making position upon movement of the shaft in one direction but ineffective during movement of the shaft in the opposite direction so that such latter movement of the shaft does not affect the position of the bridging contactor.

5. A combined switch and circuit breaker for manually opening and closing a circuit and for automatically opening the circuit when the current flow therein exceeds a predetermined value, comprising: a base of insulating material; a switch at one side of the base including a stationary contact and a contactor movable to and from a switch closed position engaging said stationary contact; a circuit breaker at the other side of the base also including a stationary contact and a contactor movable to and from a circuit making position engaging its respective stationary contact, the circuit breaker contactor having a bimetallic leg, the free end portion of which is movable laterally in one direction in consequence of a temperature rise therein due to passage through the contactor of a current exceeding a predetermined value; means on said free end portion of the bi-metallic leg defining a latching shoulder extending laterally in the direction opposite to that in which said leg portion moves due to a rising temperature thereat; latch keeper abutment means fixed with respect to the base and engageable by the latching shoulder; means mounting the contactors of the switch and the circuit breaker for bodily back and forth movement in directions substantially parallel to said bi-metallic leg and normal to the base; the contactor of the circuit breaker being in its circuit making position when the latching shoulder is engaged with the latch keeper abutment means; spring means yieldingly biasing the contactor of the circuit breaker away from its circuit making position, so that upon release of the latching shoulder the circuit breaker contactor is snapped to its circuit breaking position; a manually operable actuator passing through the base and movable back and forth with respect to the base along a path substantially normal to the base; means providing a motion transmitting connection between the actuator and the contactor of the switch whereby motion of the actuator in opposite directions effects movement of said switch contactor to and from its closed position; and means providing a lost motion connection between the actuator and the contactor of the circuit breaker operable upon movement of the actuator in the direction to effect closure of the switch, to bodily move the circuit breaker contactor to its circuit making position against the bias of the spring means thereon, but ineffective to disturb the position of the circuit breaker contactor during movement of the actuator in the opposite direction.

6. In a combined switch and circuit breaker, the combination of: a housing having an end wall; an on-off switch inside the housing; a first stationary contact mounted on and passing through said end wall and having an internal contactor engaging portion inside the housing and an external contactor engaging portion outside the housing, a second stationary contact mounted on said end wall having only an internal contactor engaging portion which is located inside the housing, and a bridging contactor inside the housing movable to and from bridging engagement with said internal contactor engaging portions; a circuit breaker outside the housing comprising the external contactor engaging portion of the first stationary contact, a third stationary contact having but a single contactor engaging portion and mounted outside the housing with its single contactor engaging portion opposite the external contactor engaging portion of the first stationary contact, and a bridging contactor outside the housing movable to and from engagement with the contactor engaging portion of the third stationary contact and the opposite external contactor engaging portion of the first stationary contact; terminals extending from the second and third stationary contacts so that a circuit connected with said terminals will be closed when the on-off switch and the circuit breaker are both closed and will be open when either the switch or the circuit breaker is open; means biasing the circuit breaker contactor to its circuit breaking position; thermally releasable latch means to hold said contactor in its circuit making position against the force of the biasing means; a common manually operable actuator axially slidably received in a hole in said end wall of the housing; means providing an operating connection between the actuator and the switch contactor through which axial movement of the actuator in one direction effects closure of the switch and movement of the actuator in the opposite direction effects opening of the switch; and means providing a lost motion driving connection between the actuator and the circuit breaker contactor effective to reset the circuit breaker, if tripped, concomitantly with closure of the switch by the actuator, and to open the switch in the event the circuit breaker trips, but ineffective to disturb the latched circuit breaker during manual opening of the switch.

7. The combined switch and circuit breaker of claim 6, wherein the biasing means is a coil spring encircling the actuator and reacting between the rear wall of the housing and the circuit breaker contactor.

8. In a combined switch and circuit breaker, the combination of: an on-off switch having stationary contact means and a contactor movable in opposite directions to and from a switch closed position engaging its stationary contact means; a circuit breaker having stationary contact means and a contactor movable in opposite directions to and from a circuit closing position engaging its stationary contact means, said contactor being biased to a circuit breaking position disengaged from its stationary contact means, the circuit breaker also having thermally releasable latch means holding its movable contactor in its circuit closing position; means connecting the on-off switch and the circuit breaker with one another and holding them in fixed tandem relationship; a common operating shaft for the on-off switch and the circuit breaker disposed axially thereof, said shaft being axially slidable; a drive connection between the contactor of the on-off switch and the shaft through which endwise movement of the shaft in one direction opens said switch and in the other direction closes said switch; and means providing a lost motion driving connection between the contactor of the circuit breaker and the shaft operable upon endwise motion of the shaft in the direction to close the on-off switch to move the contactor of the circuit breaker to its latched circuit closing position while permitting endwise motion of the shaft in the opposite direction to open the on-off switch without disturbing the contactor of the circuit breaker unit.

9. The combined switch and circuit breaker of claim 8 further characterized by the fact that said lost motion driving connection between the contactor of the circuit breaker and the shaft is effective to move the shaft endwise in the direction to open the on-off switch upon tripping of the circuit breaker, so that if closed the on-off switch is opened concomitantly with tripping of the circuit breaker.

10. The combined switch and circuit breaker of claim 8 further characterized by the fact that the on-off switch and the circuit breaker are connected in series.

11. In combination: an on-off push-pull type switch for radio and television receivers having a housing and an axially shiftable actuator shaft; an overload-tripped circuit breaker mounted upon and in tandem behind the switch housing, said circuit breaker having a contactor biased to its circuit breaking position, and thermally responsive latching means to hold the contactor in its circuit making position until released by a temperature rise thereat occasioned by the passage of excessive current through the circuit breaker; and a lost motion connection between the actuator shaft and the contactor of the circuit breaker to reset the circuit breaker concomitantly with closure of the switch while permitting the switch to be manually opened without tripping the circuit breaker, said lost motion connection also having means to move the actuator shaft in the direction to effect opening of the switch concomitantly with tripping of the circuit breaker.

12. The combination of claim 11 further characterized by the fact that said lost motion connection comprises a portion of the actuator shaft passing slidably through the contactor of the circuit breaker; and shoulders on said shaft portion in front of and behind the contactor, spaced apart a distance greater than the thickness of the contactor portion therebetween.

13. In combination: a push-pull type on-off switch having a bridging contactor movable axially of the switch; a resettable circuit breaker having a contactor biased to its circuit breaking position and having thermally responsive latching means to releasably hold its contactor in circuit making position; means electrically connecting the switch and the circuit breaker in series; means physically connecting the switch and the circuit breaker together in tandem relation; a common shaft for actuating the switch and for resetting the circuit breaker when the same is tripped, said shaft passing through the switch and entering the circuit breaker, and being axially movable; an actuating connection between the shaft and the switch contactor through which axial motion of the shaft in one direction effects closure of the switch and axial motion in the opposite direction effects opening of the switch; and a lost motion connection between the shaft and the contactor of the circuit breaker operable to reset the circuit breaker concomitantly with closure of the switch but permitting opening of the switch without tripping the circuit breaker and also operable to open the switch concomitantly with tripping of the circuit breaker.

References Cited in the file of this patent

UNITED STATES PATENTS

| | | |
|---|---|---|
| 1,939,194 | Angell | Dec. 12, 1933 |
| 2,129,792 | Sinko | Sept. 13, 1938 |
| 2,276,555 | Wolf et al. | Mar. 17, 1942 |
| 2,469,492 | Ball | May 10, 1949 |
| 2,505,326 | Jackson | Apr. 25, 1950 |
| 2,650,270 | Mucher | Aug. 25, 1953 |
| 2,694,122 | Ingwersen | Nov. 9, 1954 |
| 2,822,446 | Stanback et al. | Feb. 4, 1958 |
| 2,844,690 | Lombardo | July 22, 1958 |
| 2,881,280 | Barden et al. | Apr. 7, 1959 |